US009642336B2

(12) United States Patent
Burroughs

(10) Patent No.: US 9,642,336 B2
(45) Date of Patent: May 9, 2017

(54) PORTABLE LIGHTING APPARATUS FOR A LIVESTOCK GROOMING STAND OR CHUTE

(71) Applicant: Chad Burroughs, St. Paris, OH (US)

(72) Inventor: Chad Burroughs, St. Paris, OH (US)

(*) Notice: Subject to any disclaimer, the term of this patent is extended or adjusted under 35 U.S.C. 154(b) by 134 days.

(21) Appl. No.: 14/661,259

(22) Filed: Mar. 18, 2015

(65) Prior Publication Data

US 2015/0313181 A1 Nov. 5, 2015

Related U.S. Application Data

(60) Provisional application No. 61/988,407, filed on May 5, 2014.

(51) Int. Cl.

| | | |
|---|---|---|
| *B60Q 1/06* | (2006.01) | |
| *F21V 21/00* | (2006.01) | |
| *A01K 13/00* | (2006.01) | |
| *F21V 33/00* | (2006.01) | |
| *F21S 4/00* | (2016.01) | |
| *A01K 1/06* | (2006.01) | |
| *F21V 21/088* | (2006.01) | |
| *F21L 14/04* | (2006.01) | |
| *F21V 17/00* | (2006.01) | |
| *F21V 21/14* | (2006.01) | |
| *F21V 21/116* | (2006.01) | |

(52) U.S. Cl.
CPC ............ *A01K 13/00* (2013.01); *A01K 1/0613* (2013.01); *A01K 13/001* (2013.01); *F21L 14/04* (2013.01); *F21S 4/008* (2013.01); *F21V 17/007* (2013.01); *F21V 21/088* (2013.01); *F21V 21/145* (2013.01); *F21V 33/00* (2013.01); *F21V 21/116* (2013.01)

(58) Field of Classification Search
CPC .... A01K 13/00; A01K 1/0613; A01K 13/001; F21S 6/0005; F21S 6/006; F21S 4/008; F21L 15/08; F21L 14/04; F21V 21/06; F21V 21/145; F21V 21/088; F21V 21/116; F21V 17/007; F21V 33/00
See application file for complete search history.

(56) References Cited

U.S. PATENT DOCUMENTS 3,535,509 A * 10/1970 Thornton ................ F21V 21/14
362/220
4,197,573 A * 4/1980 Thatch ................ F21V 21/0885
362/241

(Continued)

*Primary Examiner* — Andrew Coughlin
*Assistant Examiner* — Alexander Garlen
(74) *Attorney, Agent, or Firm* — Mark A. Navarre

(57) ABSTRACT

A portable lighting apparatus including a lamp assembly that is adjustably adapted to be suspended from and secured to the side rails of a livestock grooming stand or chute, or alternately to an articulated lamp stand, to shed diffused light downward on an animal occupying the grooming stand or chute. The lamp assembly includes a rigid housing in which is received a weatherproof lighting fixture and an adjustable bracket mechanism for suspending the assembly from the side rails or lamp stand. The lamp stand includes a position-adjustable hangar assembly for supporting the lamp assembly, a base, and a set of support arms that can be collapsed to a transport position for ease of transport and storage.

9 Claims, 8 Drawing Sheets

(56) References Cited

U.S. PATENT DOCUMENTS

| | | | | | |
|---|---|---|---|---|---|
| 5,424,931 | A | * | 6/1995 | Wheeler | F21S 6/006 362/249.1 |
| 5,607,225 | A | * | 3/1997 | Halvatzis | A47F 3/001 362/125 |
| 6,854,862 | B1 | * | 2/2005 | Hopf | F21L 14/04 362/220 |
| 8,588,476 | B1 | * | 11/2013 | Spicola, Jr. | G01G 9/00 348/61 |
| 2007/0103906 | A1 | * | 5/2007 | Wang | F21V 15/01 362/277 |
| 2008/0117644 | A1 | * | 5/2008 | Li | B60Q 3/065 362/496 |
| 2008/0239730 | A1 | * | 10/2008 | Chien | F21L 14/02 362/368 |
| 2012/0182749 | A1 | * | 7/2012 | MacGregor | B60Q 3/065 362/486 |
| 2013/0258645 | A1 | * | 10/2013 | Weber | F21L 4/08 362/183 |
| 2014/0226325 | A1 | * | 8/2014 | Allen | F21V 21/088 362/231 |

* cited by examiner

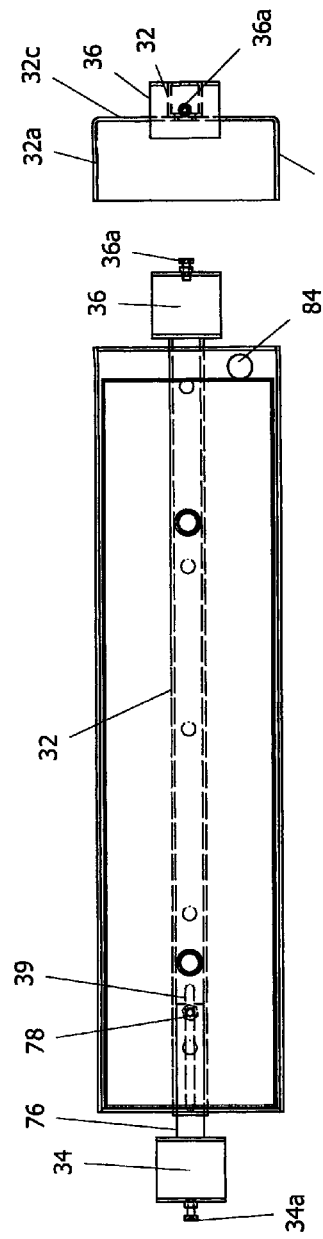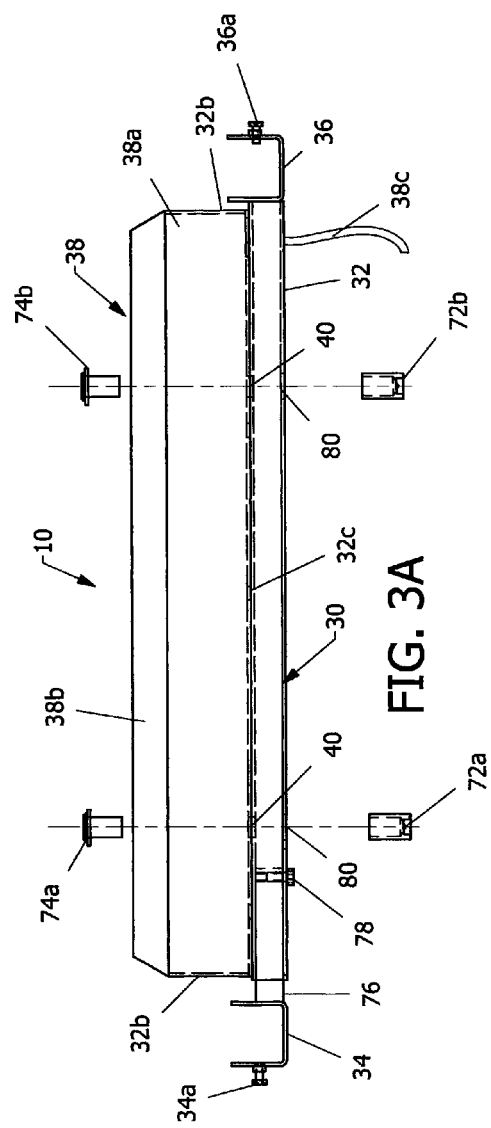

PORTABLE LIGHTING APPARATUS FOR A LIVESTOCK GROOMING STAND OR CHUTE

RELATED APPLICATIONS

This application claims priority based on the Provisional Patent Application No. 61/988,407, filed May 5, 2014.

TECHNICAL FIELD

The present invention relates to a lighting apparatus for a livestock grooming stand or chute, and more particularly to an improved lighting apparatus that is portable, waterproof, adjustable, and adapted to be suspended over an animal disposed on the grooming stand or chute.

BACKGROUND OF THE INVENTION

When an animal such as a sheep, goat or steer is being cleaned and groomed in preparation for the show ring at a competition or sale event, meticulous care is taken by the groomers to ensure that the animal's appearance is the best that it can be. During the cleaning and grooming process, the animal stands on the platform or base of a grooming stand or chute so that the entire animal can be thoroughly cleaned and groomed. In general, a stand is used for a relatively small animal such as a sheep or goat, and a chute is used for a relatively large animal such as a steer. Some stands and all chutes include tubular side rails for laterally constraining the animal, but the height of the side rails can vary depending on the model and the type of animal for which it is designed.

One of the problems frequently encountered by animal groomers is the lack of adequate lighting, particularly when the grooming stand or chute must be placed in a poorly lit area. Although portable electric floor lamps can be used to some advantage, the lighting is usually not where it needs to be and tends to produce as much glare as useful light. Accordingly, what is needed is an improved portable lighting apparatus for a livestock grooming stand or chute.

SUMMARY OF THE INVENTION

The present invention is directed to an improved portable lighting apparatus that is adjustably adapted to be suspended above an animal disposed on the platform or base of a grooming stand or chute. The apparatus includes a lamp assembly, and optionally, an articulated lamp stand for suspending the lamp assembly above the animal. In either case—that is, with or without the articulated lamp stand—the lamp assembly includes rigid housing open on one face to form a rectangular well in which is received a weatherproof lighting fixture (including fluorescent or LED lamps, for example), and an integral bracket mechanism for suspending the lamp assembly. The bracket mechanism includes a fixed tubular portion fastened to the base of the lamp assembly's housing and a movable tubular portion slidably received in the fixed tubular portion. Both tubular portions of the bracket mechanism terminate in U-shaped hangar legs directed toward the open face of the housing.

In cases where the stand or chute has tubular side rails, and the uppermost side rails are higher than the animal being groomed, the hangar legs of the lamp assembly's bracket mechanism directly engage the uppermost side rails of the stand or chute. The lateral position of the hangar legs on the movable tubular portion of the bracket mechanism can be adjusted relative to the housing accommodate the side rail separation distance of a given grooming stand or chute.

In cases where there are no side rails, or where the side rails are not higher than the animal being groomed, the articulated lamp stand is used to suspend the lamp assembly above the animal. The lamp stand includes base legs that can be slid under the platform or floor of the grooming stand or chute, a vertical support arm pivotably mounted with respect to the base legs, a horizontal support arm pivotably mounted with respect to the vertical support arm, and a hangar assembly slidably and rotatably mounted on the horizontal support arm. A set of tubular stub elements are affixed to opposing ends of the hangar assembly, and the U-shaped legs of the lamp assembly's bracket mechanism engage the tubular stub elements. The vertical support arm is longitudinally extendible so as to adjust the height of the hangar assembly, and thus the suspended lamp assembly; whereas the slidable and rotatable mounting of the hangar assembly allows the user to extend and rotate the suspended lamp assembly. And finally, the pivotable mounting of the support arms allows the lamp stand to be collapsed for ease of transport and storage.

BRIEF DESCRIPTION OF THE DRAWINGS

FIG. 3A is a partially exploded side view of the lamp assembly of FIGS. 1A-1B and 2A-2B.

FIG. 3B is top view of the lamp assembly of FIG. 3A, with the lighting fixture removed.

FIG. 3C is an end view of the lamp assembly of FIG. 3B.

DESCRIPTION OF THE PREFERRED EMBODIMENT

Figure 1A:
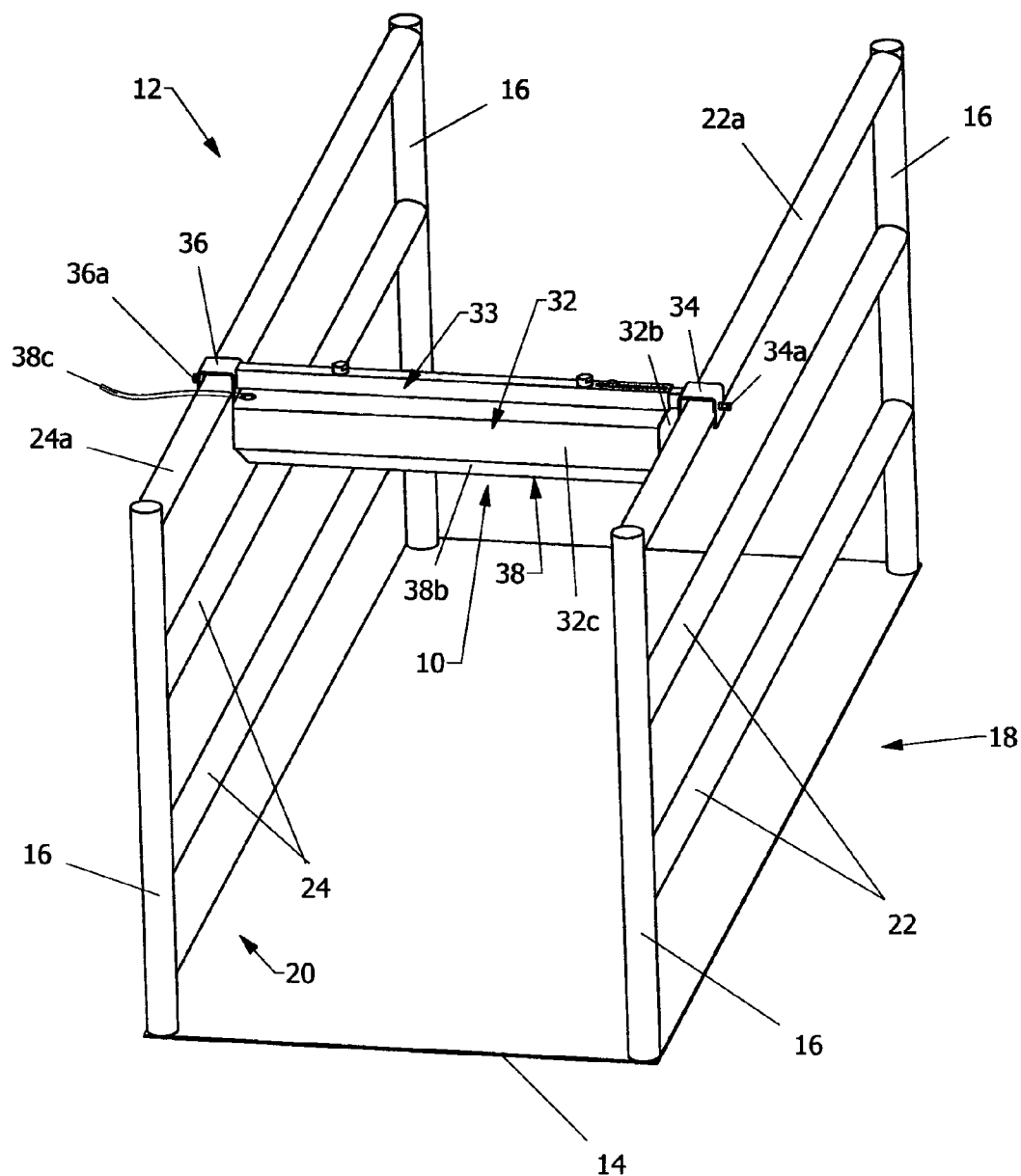
FIG. 1A is a perspective view of the lamp assembly of this invention in an application where it is supported on the uppermost side rails of a livestock grooming chute.
Figure 1B:
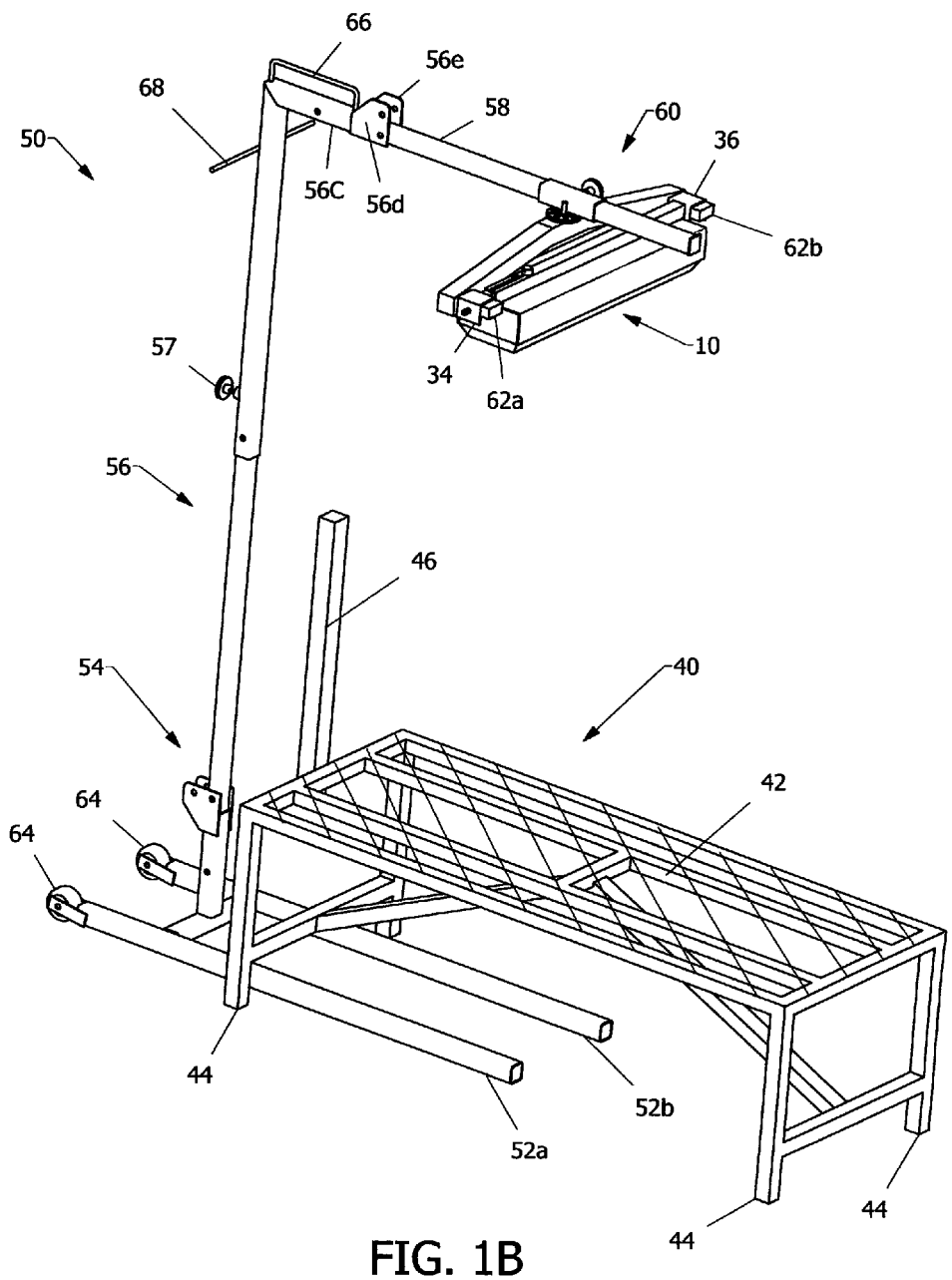
FIG. 1B is a perspective view of the lamp assembly of this invention in an application where it is supported on the articulated lamp stand of this invention above a livestock grooming stand.

Referring to the drawings, FIGS. 1A and 1B illustrate two alternate uses of the lamp assembly of this invention. In each case, the lamp assembly is generally designated by the reference numeral 10.

The illustration of FIG. 1A features a grooming chute 12 with a slip-resistant platform or base 14, a set of vertical corner posts 16 supported in the base 14, and two sets of tubular side rails 18, 20 welded to the corner posts 16 on each side of the base 14 for laterally constraining an animal standing on the base 14. The side rails 18, 20 are each composed of horizontal metal tubes 22, 24, and in this case, the uppermost metal tubes 22a, 24a are designed to be higher than an animal standing on the base 14. Gates closing the front and rear of the chute 12, and wheels for transporting the chute 12, have been omitted for simplicity. Since the uppermost metal tubes 22a, 22b of the side rails 18, 20 are higher than an animal standing on the chute's base 14, the lamp assembly 10 is supported directly on the uppermost metal tubes 22a, 24a, and secured thereto if desired.

As generally depicted in FIG. 1A, the lamp assembly 10 includes a rectangular housing 32 that fits within the side rails 18, 20 of grooming chute 12, and a bracket mechanism 33 including a pair of U-shaped brackets 34, 36 that extend beyond the ends of the housing 32. Each of the U-shaped brackets 34, 36 has a base that is parallel with the base 32c of the housing 32, and a pair of legs extending parallel to and alongside the end-walls 32b of housing 32. The legs of the U-shaped brackets 34, 36 straddle the uppermost metal tubes 22a, 24a of the grooming chute side rails 18, 20, and bolts 34a, 36a threaded into the outboard leg of each bracket 34, 36 may be tightened against the respective tube 22a, 24a to selectively lock the brackets 34, 36 to the metal tubes 22a, 24a. A weatherproof lighting fixture 38 received within the housing 32 directs diffuse light downward toward the base 14 of the chute 12 so that an animal standing on the base 14 is well illuminated. Once the lamp assembly 10 is installed on the chute 12, its longitudinal position on the metal tubes 22a, 24a may be adjusted as desired. Since grooming chutes 12 vary in width depending on style or manufacturer, the lamp assembly 10 is designed so that one of the brackets 34 is axially adjustable relative to the other bracket 36 to accommodate the side rail separation distance of any given grooming chute 12.

The illustration of FIG. 1B features a grooming stand 40 designed for grooming a sheep or goat. The stand 40 has an elevated slip-resistant platform or base 42 supported by a set of extendable legs 44 and a front post 46 for securing the animal's head, but no side rails. An equivalent situation would occur if the grooming stand 40 had side rails, but the side rails were no taller than an animal standing on the base 42. In either case, the lamp assembly 10 is supported according to this invention, by an articulated lamp stand generally designated by the reference numeral 50.

In general, the lamp stand 50 includes a set of laterally spaced base legs 52a, 52b designed to rest on the ground or floor, a base cross-member 54 coupling the base legs 52a, 52b, a vertical support arm 56, a horizontal support arm 58, and a hangar assembly 60. The base legs 52a, 52b are adapted to be partially positioned under the base 42 of the grooming stand 40 so that the vertical support arm 56 can be positioned close to the grooming stand 40, with the horizontal arm 58 and hangar assembly 60 suspended over the base 42. The hangar assembly 60 includes a set of spaced tubular stub elements 62a 62b, and the U-shaped brackets 34, 36 of the lamp assembly 10 engage the tubular stub elements 62a, 62b to support the lamp assembly as illustrated. The lamp stand 50 additionally includes a pair of wheels 64 rotatably mounted on the inboard ends of the base legs 52a, 52b to facilitate transport of the lamp stand 50 when it is placed in the transport position as illustrated in FIG. 4C; referring briefly to FIG. 4C, a pair of handles 66 and 68 formed on the vertical support arm 56 also facilitate transport of the lamp stand 50.

The vertical support arm 56 is pivotably mounted with respect to the base cross-member 54. The pivotable mount (described in further detail below in reference to FIG. 4C) allows the vertical support arm 56 to be alternately placed in a deployed position (as illustrated in FIG. 1B, for example) or a transport position (as illustrated in FIG. 4C). Additionally, the vertical support arm features a two-piece tubular construction that allows its length (i.e., its height in the deployed position) to be adjusted to adjust the height of the hangar assembly 60 (and thus, the lamp assembly 10) above the grooming stand base 42.

The horizontal support arm 58 is pivotably mounted with respect to the vertical support arm 56, and the hangar assembly 60 is slidably and rotatably mounted on the horizontal support arm 58. The pivotable mount (described in further detail below in reference to FIG. 4B) allows the horizontal support arm 58 to be alternately placed in a deployed position (as illustrated in FIG. 1B, for example) or a transport position (as illustrated in FIG. 4B). The slidable and rotatable mounting of the hangar assembly 60 on the horizontal support arm 58 allows the user to extend and rotate the hangar assembly 60 (and thus, the lamp assembly 10) in order to adequately illuminate the animal being groomed.

Figure 2A:
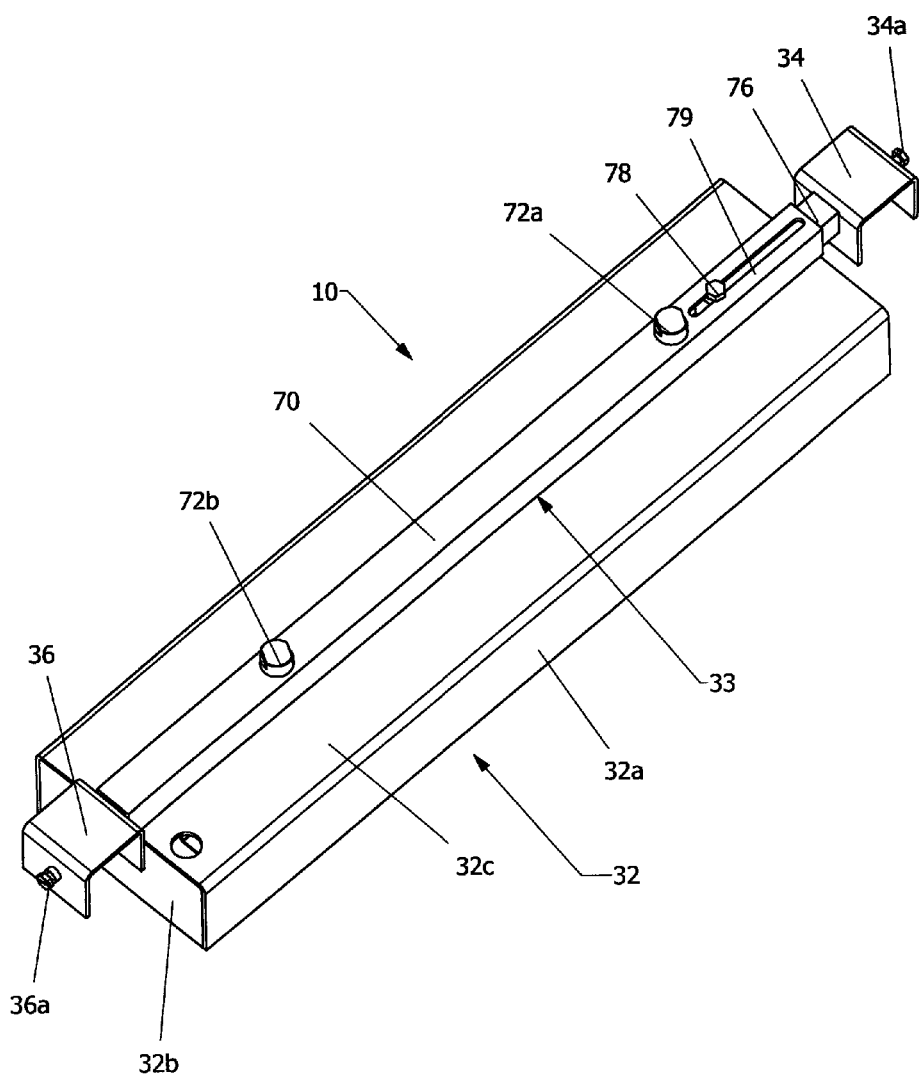
FIG. 2A is a perspective view of the lamp assembly of FIGS. 1A-1B, revealing the base of the lamp assembly housing and the bracket mechanism.
Figure 2B:
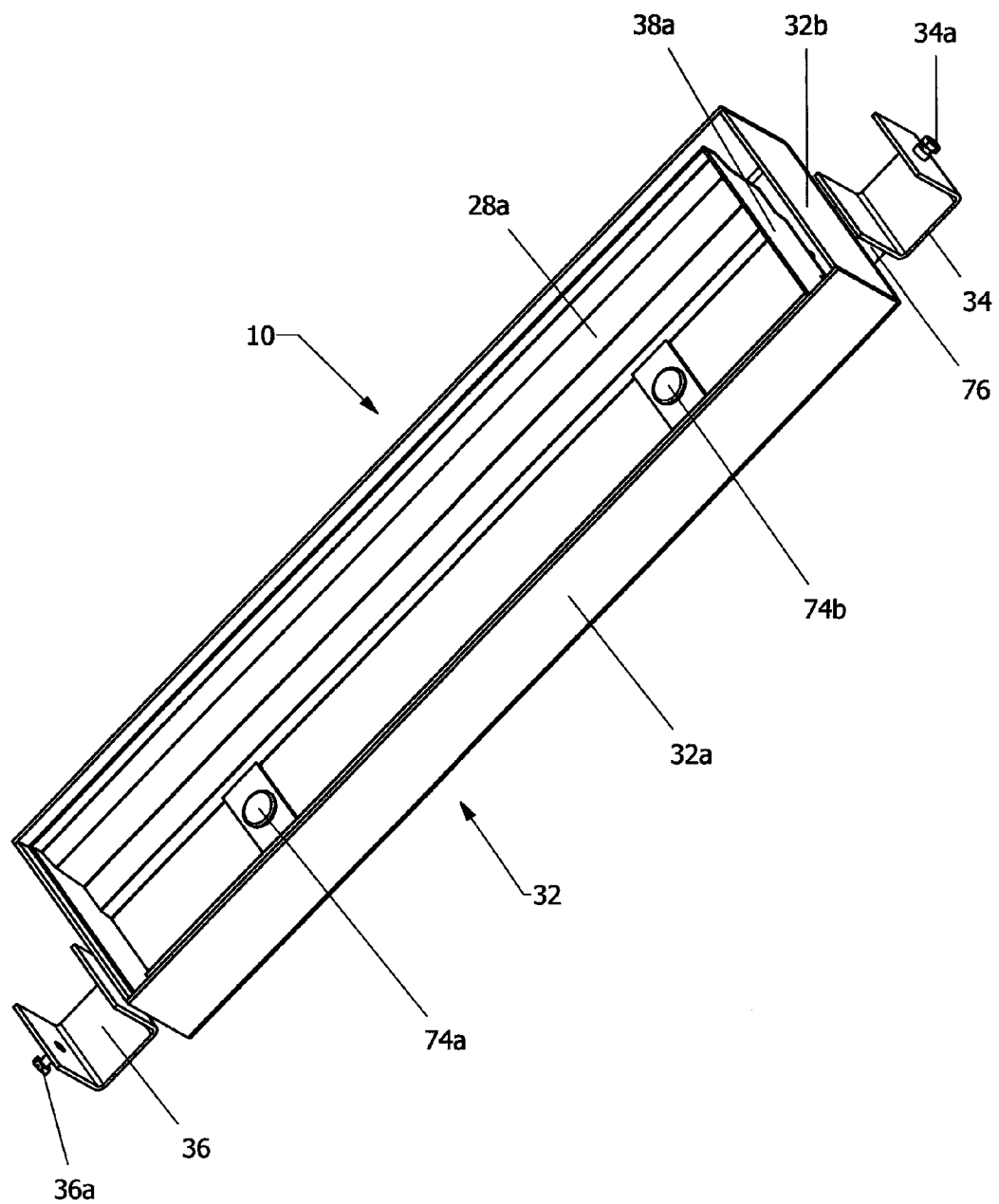
FIG. 2B is a perspective view of the lamp assembly of FIGS. 1A-1B, revealing the open face of the lamp assembly housing, and a body portion of a weatherproof lighting fixture installed in the housing.

The lamp assembly 10 is depicted in more detail in FIGS. 2A-2B and 3A-3C. As best seen in FIG. 2A, the housing 32 (which may be formed of metal or rigid plastic) is open on one face thereof to define a cavity or well sized to closely receive the body 38a of lighting fixture 38, and the sidewalls 32a and end-walls 32b of housing 32 are dimensioned so that the diffuser or bezel 38b of light fixture 38 is disposed primarily outside the housing 32; see FIG. 3A. The body 38a of fixture 38 is supported on the interior face of the housing base 32c and is fastened thereto as explained below. The lighting fixture 38 may be an off-the-shelf product incorporating fluorescent or LED lamps (not shown).

The U-shaped brackets 34, 36 form part of a bracket mechanism 33 fastened to the housing 32. The bracket mechanism 33 includes a fixed rectangular tube 70 that is fastened to the exterior periphery of housing base 32c with a pair of flange bolts 74a, 74b and mating cap nuts 72a, 72b, and a movable smaller rectangular tube 76 that is slidably received in the fixed tube 70. The U-shaped bracket 36 is welded to the outboard end of fixed tube 70 and the U-shaped bracket 34 is welded to the outboard end of movable tube 76. A bolt 78 passes through an axial slot 79 formed in the fixed tube 70, and is threaded into the movable tube 76. The head (or knob) of the bolt 78 seats against the fixed tube 70, so that it can be tightened to selectively lock the movable tube 76 to the fixed tube 70, or loosened to allow sliding adjustment of the movable tube 76 (and hence, bracket 34) as permitted by the length of slot 79 to accommodate the side rail separation distance of a given grooming chute 12.

As also seen in FIGS. 3A-3B, the light fixture body 38a, the fixed bracket tube 70 and the base 32c of housing 32 all have a pair of openings 80 that are aligned to receive the flange bolts 74a, 74b and mating set of cap nuts 72a, 72b. The flange bolts 74a, 74b seat against the inner periphery of the lighting fixture base 38a, and the cap nuts 72a, 72b seat against the fixed bracket tube 70 so as to secure both the lighting fixture base 38a and the fixed bracket tube 70 to the base 32c of housing 32. The base 32c of housing 32 is additionally provided with an opening 84 through which the electrical cord 38c of lighting fixture 38 is routed, and a resilient grommet (not shown) seals the opening 84 around the cord 38c.

Figure 4A:
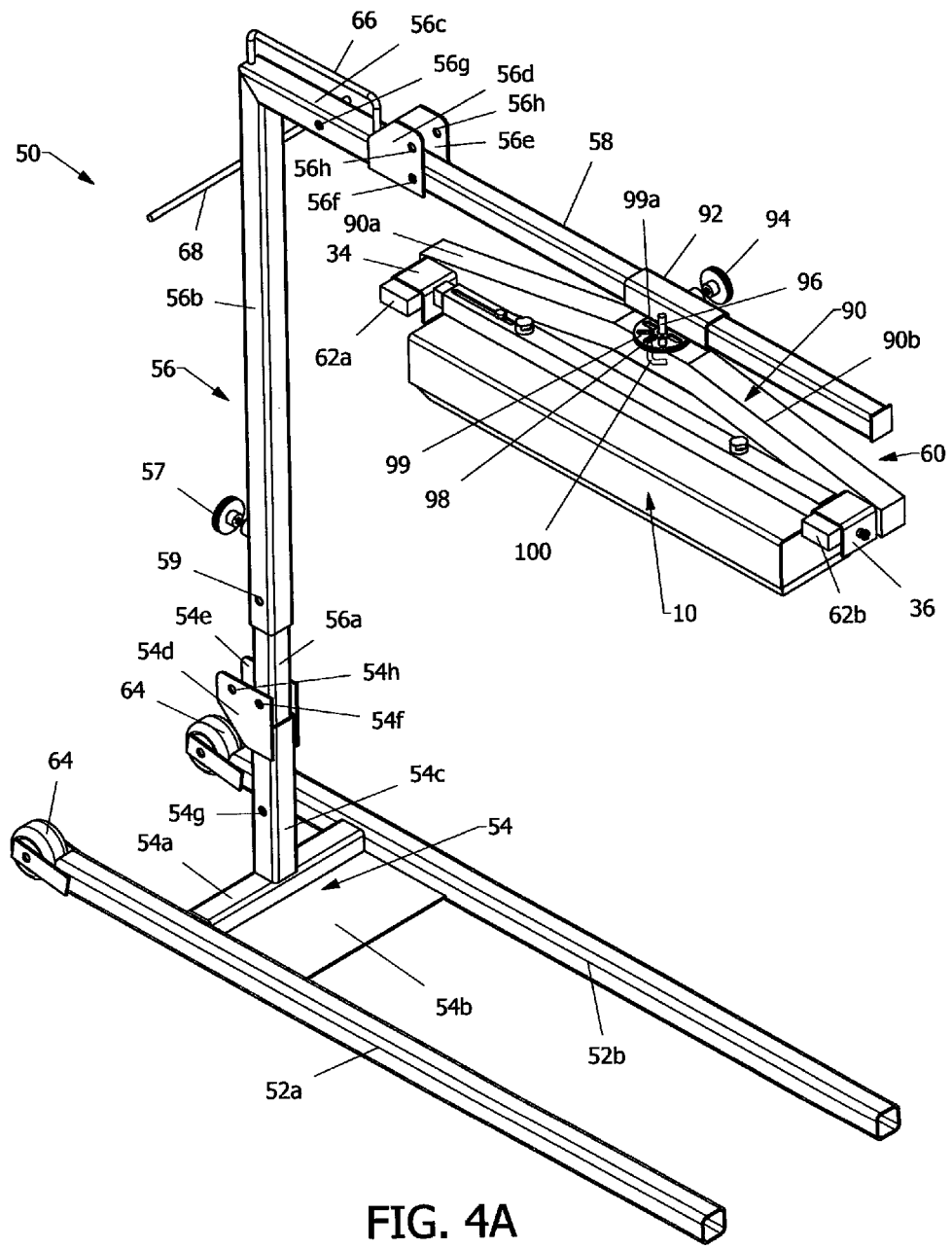
FIG. 4A is a first perspective view of the articulated lamp stand of this invention, with its hangar assembly in a transport position.
Figure 4B:
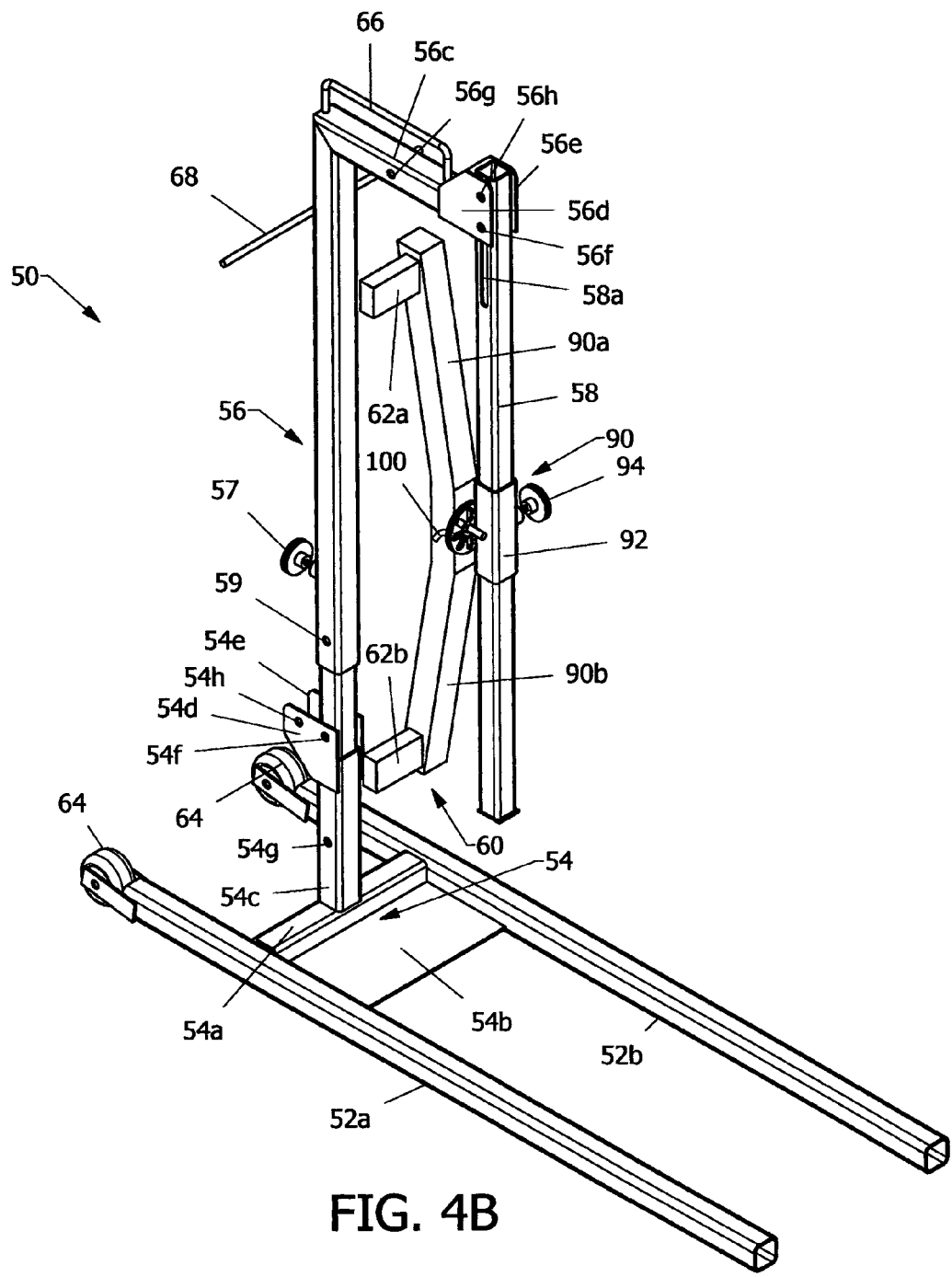
FIG. 4B is a second perspective view of the articulated lamp stand of this invention, with its hangar assembly and horizontal support arm in their transport positions.
Figure 4C:
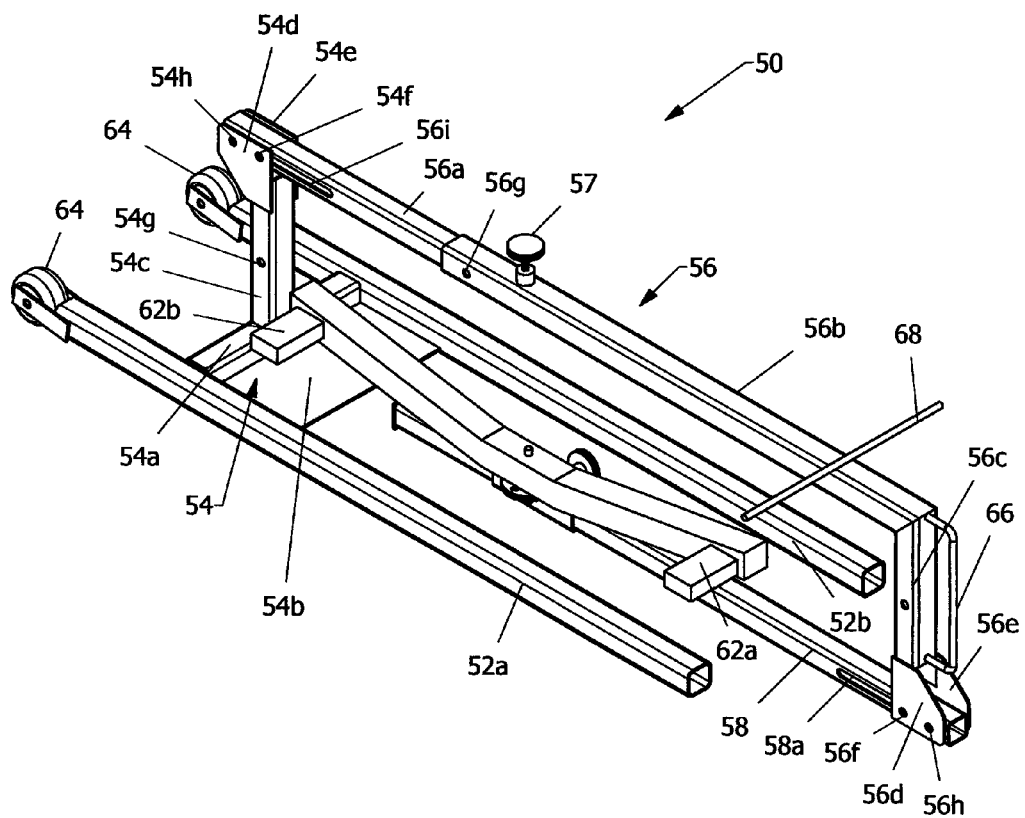
FIG. 4C is a third perspective view of the articulated lamp stand of this invention, with its hangar assembly, and horizontal and vertical support arms in their transport positions.

FIGS. 4A-4C depict the lamp stand 50 in additional detail, and illustrate how it can be collapsed to its transport position for ease of transport and storage. In the process of collapsing the lamp stand 50, the vertical and horizontal support arms 56, 58 are pivoted from their deployed orientations, and may no longer be "vertical" or "horizontal", but it will be understood that such adjectives refer to the orientation of the respective arms or tubes when in the deployed position of FIG. 1B, for example.

FIG. 4A depicts the lamp stand 50 as in FIG. 1B, but with the hangar assembly 60 rotated by approximately 90 degrees. As best seen in FIG. 4A, the hangar assembly 60 includes a hangar 90 having a pair of oppositely extending and downwardly depending arms 90a, 90b, with the tubular stub elements 62a 62b protruding from the arms 90a, 90b at or near their ends. The hangar 90 is rotatably mounted below a tubular sleeve 92 that is slidably received on the horizontal support arm 58. The position of the sleeve 92 on the horizontal support arm 58 can be adjusted to shift the position of the hangar 90 with respect to the grooming stand 40, and a knobbed set screw 94 threaded into the sleeve 92 is provided for securing the sleeve 92 in a desired position on the horizontal support arm 58. The hangar 90 is rotatably supported with respect to the sleeve 92 by an axle 96 welded to the sleeve 92. A set of circular plates 98, 99 disposed between the sleeve 92 and hangar 90, along with a spring-loaded lock pin 100 formed on the hangar 90, define a set of fixed rotary positions of the hangar 90. The plate 98 is welded to the hangar 90, and includes a single circular opening in its periphery for receiving the lock pin 100; whereas the plate 99 is welded to the sleeve 92 and includes a distributed set of peripheral slots 99a for receiving the lock pin 100. In this way, the hangar 90 (and thus, the lamp assembly 10) can be longitudinally shifted along the horizontal support arm 58 and/or rotated with respect to the horizontal support arm 58 to position the lamp assembly 10 where needed to adequately illuminate an animal standing on the grooming stand 40.

It should be additionally noted that in the illustration of FIG. 4A, the vertical support arm 56 of lamp stand 50 is retracted, relative to the extended position depicted in FIG. 1B. As mentioned above, the vertical support arm 56 includes a pair of tubular elements 56a, 56b, with the lower, and smaller, element 56a extending partially into the upper, and larger, element 56b. A knobbed set screw 57 threaded through the upper tubular element 56b can be tightened to mutually secure the tubular elements 56a, 56b when the horizontal support arm 58 is at a desired height. Additionally, an internal locking snap pin (not shown) can be provided to limit the extension of the upper element 56b, and lock the elements 56a, 56b together at the upper limit; the opening 59 is provided in upper element 56b for this purpose.

As mentioned above, the pivotable mounting of the vertical and horizontal support arms 56, 58 allow the lamp stand 50 to be collapsed for ease of transport and storage. The first steps in the collapsing procedure are illustrated in FIG. 4A—lowering the upper element 56b of the vertical support arm 56 and securing it with set screw 57, and rotating the hangar 90 so that its arms 90a, 90b are parallel to the horizontal support arm 58. The lamp assembly 10 can be removed from the hangar 90 at this point, or earlier in the collapsing process.

The next step in collapsing the lamp stand 50 is illustrated in FIG. 4B—releasing the horizontal support arm 58 from the horizontal stub tube 56c of vertical support arm 56, pivoting it downward to the transport position as shown, and securing it in place. The outboard end of horizontal stub tube 56c terminates in a pair of flat plates 56d, 56e spaced sufficiently to receive the horizontal support arm 58, and a fixed pin 56f bridging the plates 56d, 56e passes through a longitudinal slot 58a in the horizontal support arm 58. This coupling permits the horizontal support arm 58 shift longitudinally with respect to the vertical support arm 56, and when shifted away from the vertical support arm 56, to pivot downward as shown in FIG. 4B. When the horizontal support arm 58 is in its deployed position (as in FIG. 4A, for example), it is shifted toward the vertical support arm 56, and its inboard end is received within the horizontal stub tube 56c. When the pin 56f bridging the plates 56d, 56e reaches the inboard end of slot 58a, the circular opening 56g in horizontal stub tube 56c is aligned with a similar opening (not shown) in the inboard end of horizontal support arm 58, and a lock pin or bolt (not shown) can be inserted through the aligned openings to rigidly fasten the horizontal support arm 58 to the horizontal stub tube 56c of vertical support arm 56. Conversely, when the horizontal support arm 58 is shifted away from the vertical support arm 56 and the pin 56f reaches the outboard end of slot 58a, the horizontal support arm 58 is free to pivot downward as shown in FIG. 4B. In the position depicted in FIG. 4B, the opening (not shown) in the inboard end of horizontal support arm 58 is aligned with a pair of similar openings 56h in the plates 56d, 56e, and a lock pin or bolt (not shown) can be inserted through the aligned openings to rigidly fasten the horizontal support arm 58 in the folded or transport position.

The next, and final, step in collapsing the lamp stand 50 is illustrated in FIG. 4C—releasing the vertical support arm 56 from base cross member 54, pivoting it downward to the transport position as shown, and securing it in place. The base cross member 54 includes a cross tube 54a and plate 54b coupling the two base legs 52a, 52b, and a vertical stub tube 54c extending upward from, and perpendicular to, the cross tube 54a. The outboard end of vertical stub tube 54c terminates in a pair of flat plates 54d, 54e spaced sufficiently to receive the lower portion 56a of the vertical support arm 56, and a fixed pin 54f bridging the plates 54d, 54e passes through a longitudinal slot 56i in the lower portion 56a of the vertical support arm 56. This coupling permits the vertical support arm 56 to shift longitudinally (i.e., up and down) with respect to the vertical stub tube 54c, and when shifted away from the vertical stub tube 54c, to pivot downward (with the horizontal support arm 58) as shown in FIG. 4C. When the vertical support arm 56 is in its deployed position (as in FIGS. 4A-4B, for example), it is shifted downward toward the vertical stub tube 54c, and its inboard (lower) end is received within the vertical stub tube 54c. When the pin 54f bridging the plates 54d, 54e reaches the inboard end of slot 56i, the circular opening 54g in vertical stub tube 54c is aligns with a similar opening (not shown) in the lower portion 56a of the vertical support arm 56, and a lock pin or bolt (not shown) can be inserted through the aligned openings to rigidly fasten the vertical support arm 56 to the vertical stub tube 54c of base cross member 54. Conversely, when the vertical support arm 56 is shifted (upward) away from the vertical stub tube 56c and the pin 54f reaches the outboard end of slot 56i, the vertical support arm 56 is free to pivot downward as shown in FIG. 4C. In the position depicted in FIG. 4C, the opening (not shown) in the end of the lower portion 56a of the vertical support arm 56 is aligned with a pair of similar openings 54h in the plates 54d, 54e, and a lock pin or bolt (not shown) can be inserted through the aligned openings to rigidly fasten the vertical support arm 56 in the folded or transport position. At this point, the lamp stand 50 is locked in the transport position, and the user can easily transport it by grasping either handle 66, 68 and lifting so that only the wheels 64 engage the ground. The U-shaped handle 66 formed on the vertical stub tube 56c is designed for transport by one person, whereas the bar handle 68 welded to the upper portion 56b of vertical support arm 56 is designed for transport by two persons, each person grasping one end of the bar handle 68.

As described above, the lamp assembly 10 and lamp stand 50 of the present invention address a previously-unsolved problem facing livestock groomers—namely, adequate lighting. The lamp assembly 10 and the lamp stand 50 are portable and can be easily transported along with other grooming supplies and equipment, and the lamp assembly bracket mechanism 33 is easily adjusted to fit nearly any grooming chute. Furthermore, the position of the lamp assembly on the chute's side rails may be easily adjusted once installed to provide light where needed. And if necessary, the lamp assembly 10 may be suspended from a lower set of side rail tubes than shown, or by the lamp stand 50 as illustrated in FIG. 1B.

And while the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A lighting apparatus for illuminating an animal, comprising:
   a livestock grooming stand or chute having a platform on which said animal is disposed;
   a lamp assembly including a housing open on one face thereof to define a well in which is received a lighting fixture, and a bracket mechanism affixed to a base of said housing, said bracket mechanism including a first tubular section affixed to said housing and terminating in a first U-shaped bracket, and a second tubular section slidably received within said first tubular section and terminating in a second U-shaped bracket, the second tubular section being slidably adjustable with respect to said first tubular section adjust a separation distance of said first and second U-shaped brackets; and
   a lamp assembly support structure that engages the first and second U-shaped brackets of said bracket mechanism to suspend said lamp assembly over said platform of said livestock grooming stand or chute, with said lighting fixture directing light downward toward the animal disposed on said platform, where said lamp assembly support structure includes a first support arm extending parallel to said platform above said animal disposed on said platform and a hangar assembly mounted on said first support arm, said hangar assembly including first and second oppositely extending arms with tubular stub elements that engage said first and second U-shaped brackets of said bracket mechanism.

2. The lighting apparatus of claim 1, further comprising:
   a first locking mechanism threaded into said second tubular section and passing through an axial slot in said first tubular section for selectively locking together said first and second tubular sections.

3. The lighting apparatus of claim 1, further comprising:
   second locking mechanisms threaded into the first and second U-shaped brackets of said bracket mechanism for selectively locking together said bracket mechanism and said lamp assembly support structure.

4. The lighting apparatus of claim 1, where said lamp assembly support structure further comprises:
   a pair of tubular side rails on said grooming stand or chute for laterally constraining said animal on said platform, where said pair of tubular side rails alternately engage said first and second U-shaped brackets of said bracket mechanism to suspend said lamp assembly over said platform.

5. The lighting apparatus of claim 1, where:
   said hangar assembly is slidably and rotatably mounted on said first support arm to permit both longitudinal and rotational adjustment of said lamp assembly with respect to said animal.

6. The lighting apparatus of claim 1, further comprising:
   a support base and second support arm that support said first support arm, said second support arm being disposed in a vertical orientation and being adjustable in length to adjust a height of said lamp assembly with respect to said animal.

7. The lighting apparatus of claim 6, where:
   said support base includes a set of legs that extend under said platform of said grooming stand or chute.

8. A lighting apparatus for illuminating an animal, comprising:
   a livestock grooming stand or chute having a platform on which said animal is disposed;
   a lamp assembly including a housing open on one face thereof to define a well in which is received a lighting fixture, and a bracket mechanism affixed to a base of said housing, said bracket mechanism including a first tubular section affixed to said housing and terminating in a first U-shaped bracket, and a second tubular section slidably received within said first tubular section and terminating in a second U-shaped bracket, the second tubular section being slidably adjustable with respect to said first tubular section adjust a separation distance of said first and second U-shaped brackets; and
   a lamp assembly support structure that engages the first and second U-shaped brackets of said bracket mechanism to suspend said lamp assembly over said platform of said livestock grooming stand or chute, with said lighting fixture directing light downward toward the animal disposed on said platform, where said lamp assembly support structure is a free-standing articulated assembly, including base legs extending under said platform of said grooming stand or chute, an adjustable length support arm pivotably mounted with respect to said base legs with a deployed position in which it extends vertically with respect to said platform, a fixed length support arm pivotably mounted with respect to said adjustable length support arm with a deployed position in which it extends parallel to said platform, and a hangar assembly slidably and rotatably mounted on said fixed length support arm, said hangar assembly including first and second oppositely extending arms with tubular stub elements that engage said first and second U-shaped brackets of said bracket mechanism, whereby adjusting the length of said adjustable length support arm adjusts a height of said lamp assembly above said animal.

9. The lighting apparatus of claim 8, where:
   said fixed length support arm has a pivoted transport state in which it is parallel to said adjustable length support arm; and
   said adjustable length support arm has a pivoted transport state in which it is parallel to said base legs.

* * * * *